United States Patent [19]

Wolfe

[11] Patent Number: 5,410,462
[45] Date of Patent: Apr. 25, 1995

[54] MODULAR RECESSED COMPACT FLUORESCENT LAMP FIXTURE

[75] Inventor: Denis G. Wolfe, Diablo, Calif.

[73] Assignee: USI Lighting, Inc., San Leandro, Calif.

[21] Appl. No.: 154,607

[22] Filed: Nov. 18, 1993

[51] Int. Cl.⁶ ............................................. F21S 1/06
[52] U.S. Cl. .................................. 362/365; 362/216; 362/221; 362/319
[58] Field of Search ............... 362/221, 365, 366, 216, 362/319

[56] References Cited

U.S. PATENT DOCUMENTS

| | | | |
|---|---|---|---|
| 3,558,873 | 1/1971 | Smith | 240/51.11 |
| 3,743,826 | 7/1973 | Halfaker | 240/9 A |
| 3,796,870 | 3/1974 | Pettyjohn | 240/51.11 R |
| 3,919,459 | 11/1975 | Van Steenhoven | 174/63 |
| 4,000,406 | 12/1976 | Bhavsar | 240/11.2 R |
| 4,164,783 | 8/1979 | Wandler | 362/226 |
| 4,414,489 | 11/1983 | Young | 315/51 |
| 4,520,436 | 5/1985 | McNair | 362/366 |
| 4,739,188 | 4/1988 | DeCandia et al. | 307/149 |
| 4,916,363 | 4/1990 | Burton et al. | 315/276 |
| 4,922,393 | 5/1990 | McNair | 362/225 |
| 5,013,253 | 5/1991 | Aiello et al. | 439/235 |
| 5,122,944 | 6/1992 | Webb | 362/365 |
| 5,177,404 | 1/1993 | Cohen et al. | 315/154 |
| 5,192,218 | 3/1993 | Kuiper | 439/226 |
| 5,226,724 | 7/1993 | Kanarek | 362/260 |
| 5,264,994 | 11/1993 | Choi | 362/365 |

FOREIGN PATENT DOCUMENTS 4200659  7/1993  Germany ........................... 362/216

Primary Examiner—James C. Yeung
Attorney, Agent, or Firm—Thomas E. Schatzel

[57] ABSTRACT

A fluorescent lamp fixture embodiment of the present invention comprises a frame module, a ballast module, a socket housing module and a reflector module that all interconnect via a standardized connection system. The ballast module is attached to a ballast plate and snaps onto a junction box wrapper that has a junction box baseplate. The frame module snaps onto the junction box wrapper together with the socket housing module. The reflector module also attaches directly to the frame module.

5 Claims, 2 Drawing Sheets

MODULAR RECESSED COMPACT FLUORESCENT LAMP FIXTURE

BACKGROUND OF THE INVENTION

1. Field of the Invention

The present invention relates generally to electrical lighting, and more specifically to fluorescent lamp fixtures.

2. Description of the Prior Art

The increasing popularity of fluorescent lamps has spawned a number of variations in lamp wattages, physical lengths and the number of lamps combined in a fixture. Such variety allows consumers to use fluorescent lamps in a wide array of applications.

However, such variations on the basic lamp fixture increase manufacturing cost and complexity. For example, in compact fluorescent recessed fixtures, nine, thirteen, eighteen and twenty-six watt lamps are universally employed and are the usual choices. The lamp configuration can be either twin tube or quad tube for the nine and thirteen watt types, while the eighteen and twenty-six watt types are in quad format only. Each lamp type has its own socket type, thus there are at least six socket variants. Ballasts to power such lamps are specific to each lamp wattage, each lamp type, each supply line voltage and each power factor format, e.g., high or low power factor. Thus the number of ballast variants exceeds twenty. Each fixture requires a reflector for the lamp, and each reflector is specific to the lamp wattage, lamp type and optical performance required. In one series, there may be three height variations and two variations in diameter, yielding six unique reflectors.

From a manufacturing perspective, it would be ideal if the items that vary the most could be isolated into modules, so that there would be a minimum of parts necessary and so assembly could be simplified. Otherwise, many fixture variations would have to be stocked by manufacturers in their final, unique configurations.

SUMMARY OF THE PRESENT INVENTION

It is therefore an object of the present invention to provide a fluorescent lamp fixture that accommodates lamp type, wattage, reflector, etc., variations byway of easy assembly modules.

Briefly, a fluorescent lamp fixture embodiment of the present invention comprises a frame module, a ballast module, a socket housing module and a reflector module that all interconnect via a standardized connection system. The ballast module is attached to a ballast plate and snaps onto a junction box wrapper that has a junction box baseplate. The frame module contains the junction box wrapper. The socket housing module snaps onto the junction box wrapper. The reflector module also attaches directly to the frame module.

An advantage of the present invention is that it provides a lighting system that can be modularly assembled.

Another advantage of the present invention is that it provides a lighting fixture that lends itself to manufacturing ease and inventory control.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
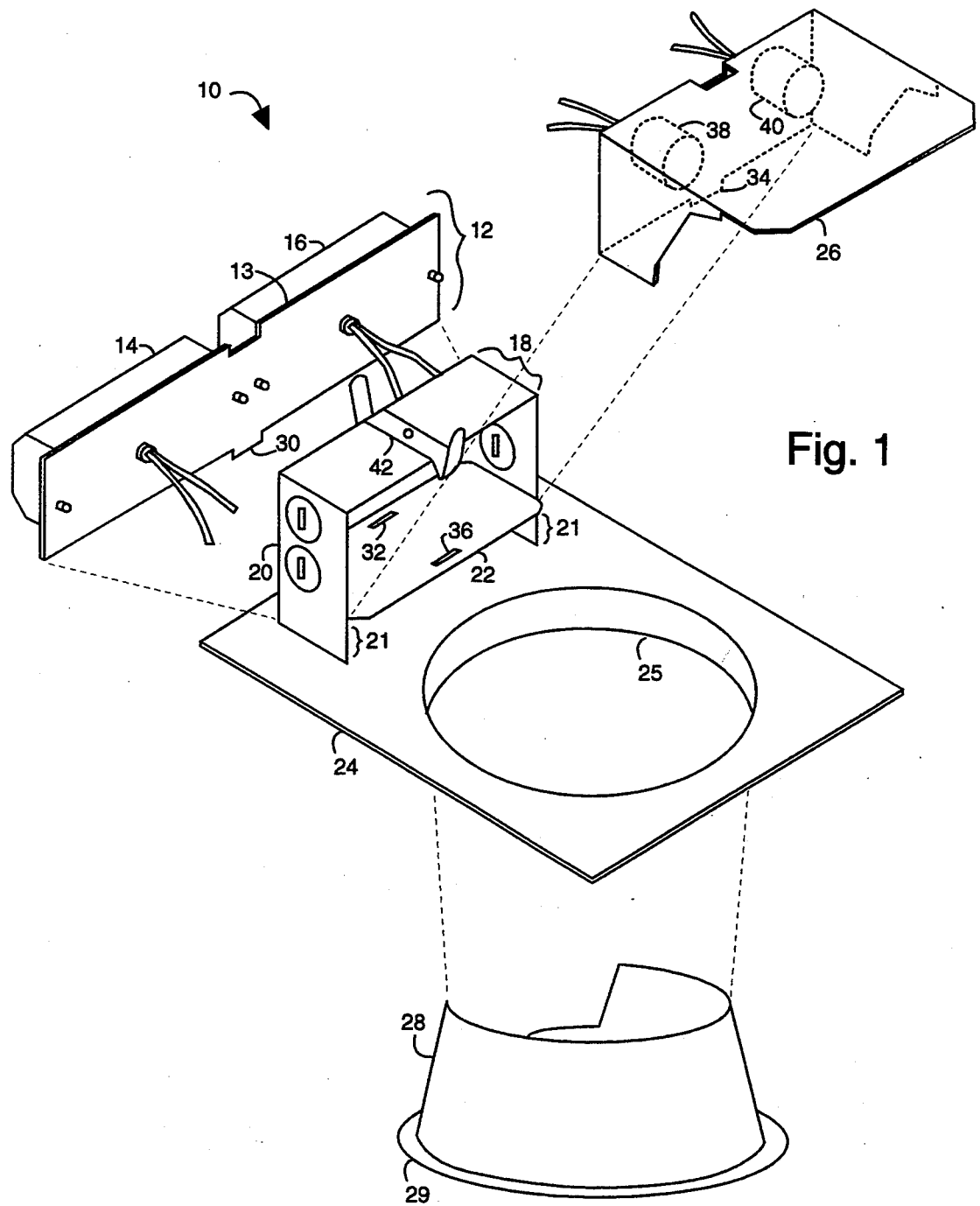
FIG. 1 is a perspective view exploded assembly diagram of a modular fluorescent lamp fixture embodiment of the present invention.

FIG. 1 illustrates a fluorescent lamp fixture embodiment of the present invention, referred to by the general reference numeral 10. The fixture 10 comprises a ballast module 12 having ballast plate 13 for mounting one or a pair of ballasts 14 and 16, a junction box 18 that includes a junction box wrapper 20 with a pair of leg extensions 21 and a junction box base plate 22, a frame 24 with an opening 25, a socket housing 26 and a reflector 28 having a lip 29. Single ballasts that can drive two lamps can be alternatively used to replace both the ballasts 14 and 16. Ballast module 12 snaps onto junction box 18 with the aid of a tab 30 that slips into a slot 32. Socket housing 26 snaps onto the opposite side of junction box 18 with the aid of a tab 34 that slips into a slot 36. A pair of lamp sockets 38 and 40 provide for electrical connection to a pair of fluorescent lamps in a twin-tube configuration. Reflector 28 connects to socket housing 26 through frame 24.

Although the leg extensions 21 preferably vary 28, the placement of baseplate 22 preferably is constant, thus allowing a single-sized ballast plate 13 to be used. Similarly, socket housing 26 is preferably constructed of a piece that does not vary in size with changes in reflector 28 or ballasts 14 and 16.

The frame 24 and the junction box 18 form a frame module for modular assembly of fixture 10, which varies only in height for the junction box wrapper 20 and in the aperture hole size for reflector 28.

For ballast module 12, only ballasts 14 and 16 vary to accommodate a variety of fluorescent lamp types and wattages. Socket housing 26 and sockets 38 and 40 together form a socket housing module that also provide for the modular assembly of fixture 10. The ballast module 12 serves as a door for the junction box 18, while the socket housing 26 functions as another door on the opposite side. A spring 42 snaps over both ballast module 12 and socket housing 26 to retain them in place.

Figure 2A:
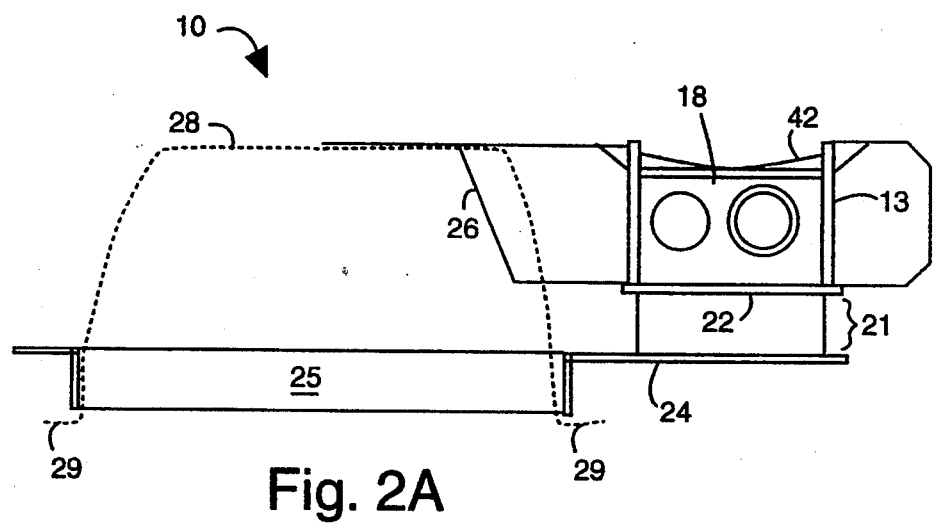
FIGS. 2A and 2B are cross-sectional diagrams of the fixture of FIG. 1 and differ in leg extension heights to accommodate two differently dimensioned reflectors.
Figure 2B:
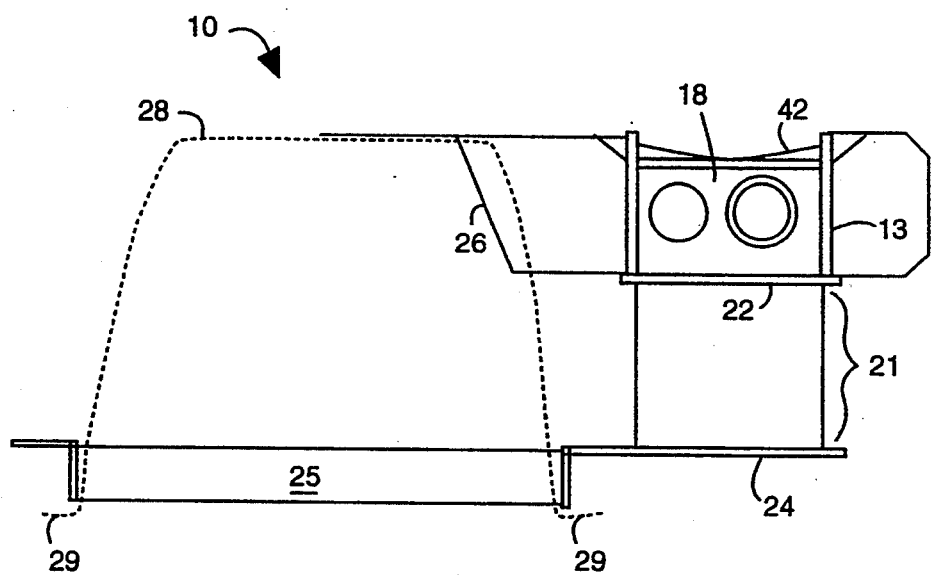

The construction of junction box 18 preferably allows inclusion in fixture 10 of reflectors 28 having various heights. Leg extensions 21 accommodate these variations, as illustrated in FIGS. 2A and 2B. FIG. 2A shows a relatively short leg extension 21 that suits a relatively squat reflector 28. An elongated reflector 28 is illustrated in FIG. 2B, compared to that in FIG. 2A. In FIG. 2B, leg extensions 21 are increased in height.

Figure 3:
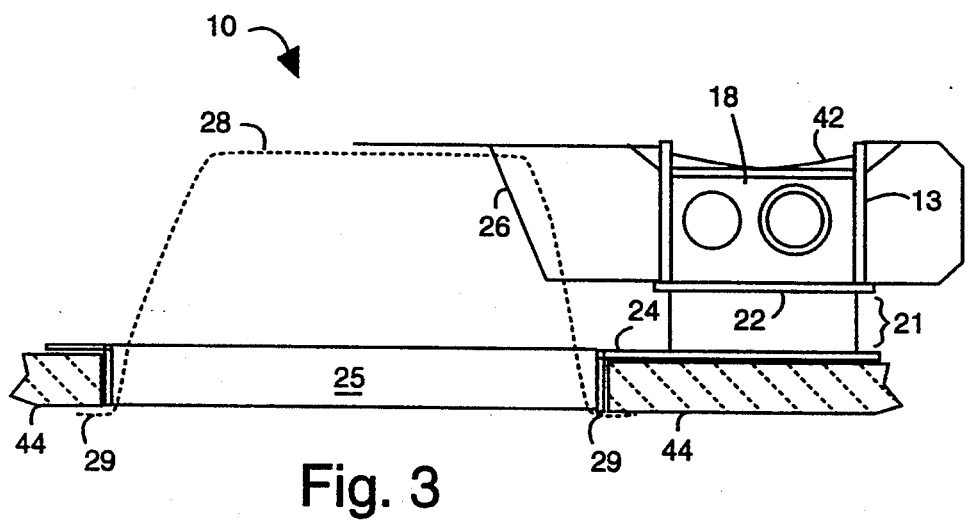
FIG. 3 is a cross-sectional diagram of the fixture of FIG. 1 mounted in a ceiling.

FIG. 3 shows how fixture 10 accommodates a ceiling 44 when installed in a recessed location. The flat surface of frame 24 sits on top of an opening in ceiling 44 and a reflector 28 is inserted from beneath to engage socket housing 26. An extra length of reflector 28 is taken up by the thickness of ceiling 44 with the lip 29 engaged about the lower surface of ceiling 44 such that the frame 24 and reflector 28 are interlocked with the ceiling 44 gripped in between. Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A modular fluorescent lighting fixture, comprising:
a junction box with an open front end, an open rear end, and a leg extension on each lateral side;
a ballast module with a ballast plate fitted to cover said open rear end of the junction box and further including a fluorescent lamp ballast;
a socket housing fitted to cover said open front end of the junction box and including a socket for receiving a fluorescent lamp;
a frame with means to attach to the junction box at said leg extensions and having an opening proximate to said fluorescent lamp socket; and
a reflector inserted through and secured by its fit in said opening in the frame and engaged to the socket housing.

2. The fixture of claim 1, wherein:
said ballast plate includes means for engaging and supporting a variety of said ballasts of substantially different sizes.

3. The fixture of claim 1, wherein:
the junction box includes means for engaging said leg extensions of a variety of substantially different lengths to receive a variety of the reflector of substantially different lengths.

4. The fixture of claim 1, wherein:
the reflector and the frame are sized to fit together and provide for engaging a ceiling hole from above and below by passing the reflector through the bottom of said ceiling hole and engaging said frame opening when positioned above said ceiling hole.

5. The fixture of claim 4, wherein:
the reflector is dimensioned relative to said leg extension of the junction box such that a different thickness ceilings may be gripped between the frame and the reflector through a hole in the ceiling.

* * * * *